United States Patent [19]
Saito

[11] 3,987,472

[45] Oct. 19, 1976

[54] BELLOWS DEVICE HAVING AN AUTOMATIC DIAPHRAGM-INTERLOCKING MECHANISM

[75] Inventor: Yutaka Saito, Koganei, Japan

[73] Assignee: Nippon Kogaku K.K., Tokyo, Japan

[22] Filed: Sept. 29, 1975

[21] Appl. No.: 617,511

[30] Foreign Application Priority Data
Oct. 7, 1974   Japan.............................. 49-120237

[52] U.S. Cl.................................. 354/232; 354/46; 354/158; 354/187; 354/272; 354/286
[51] Int. Cl.² ............................................ G03B 9/00
[58] Field of Search ............ 354/231, 232, 272, 196, 354/269, 266, 286, 288, 158, 46, 187

[56] References Cited
UNITED STATES PATENTS
3,849,787   11/1974   Nakagawa........................... 354/232

Primary Examiner—Monroe H. Hayes
Attorney, Agent, or Firm—Shapiro and Shapiro

[57] ABSTRACT

A bellows device having an automatic diaphragm-interlocking mechanism comprises a camera mount, a bellows portion, a lens mount and a guide rail. The camera mount is provided with an interlocking lever operatively associated with the shutter mechanism of a camera body so as to be operable in response to a diaphragm blade stop-down signal during shutter release. The lens mount is provided with a diaphragm-interlocking lever operable to actuate a diaphragm lever operatively associated with the aperture mechanisms of the lens. The bellows device includes a rocking member comprising a pair of arms extending along the guide rail, the arms being moveable in opposite directions. The rocking member is operable by the interlocking lever. The device also includes an actuating member having detecting portions corresponding to and engageable with the arms of the rocking member. The actuating member is operable to actuate the diaphragm-interlocking lever upon detection of the stop-down signal through identical one of the pair of arms irrespective of whether the actuating member is installed in the normal or the reverse direction with respect to the camera body.

3 Claims, 7 Drawing Figures

BELLOWS DEVICE HAVING AN AUTOMATIC DIAPHRAGM-INTERLOCKING MECHANISM

BACKGROUND OF THE INVENTION

1. Field of the Invention

This invention relates to a bellows device having an automatic diaphragm-interlocking mechanism for use in a single-lens reflex camera.

2. Description of the Prior Art

To effect close-up or magnified picture-taking by the use of a single-lens reflex camera with a bellows device intervening between the camera body and the picture-taking lens, a bellows device has been proposed which has a so-called automatic diaphragm-interlocking mechanism for opening the aperture of the picture-taking lens during focusing to enable bright images to be viewed to thereby facilitate the focusing and for automatically stopping down the aperture to a predetermined value immediately before picture-taking.

This prior art bellows device has a rockable rod provided on a rail of the device, and a stop-down signal from the camera body is transmitted through the rod to a diaphragm-interlocking lever for actuating the aperture ring for the lens, thereby accomplishing stop-down of the aperture. In equimultiple or higher magnification, it is often the case, because of the lens performance, that the lens is used with its direction reversed. In such use of the lens, the interlocking mechanism is of no utility because the automatic diaphragm-interlocking mechanism of the bellows device is rendered inoperable.

SUMMARY OF THE INVENTION

It is an object of the present invention to provide a bellows device in which the automatic diaphragm-interlocking mechanism is operable irrespective of whether the picture-taking lens is attached in the normal or in the reverse direction.

According to the present invention, the bellows device having an automatic diaphragm-interlocking mechanism comprises a camera mount, a bellows portion, a lens mount and a guide rail. The camera mount is provided with an interlocking lever operatively associated with the shutter mechanism of a camera body so as to be operable in response to a diaphragm blade stop-down signal during shutter release. The lens mount is provided with a diaphragm-interlocking lever operable to actuate a diaphragm lever operatively associated with the aperture mechanism of the lens. The bellows device includes a rocking member comprising a pair of spaced arms extending along the guide rail, the rocking member being mounted so that the arms are moveable in opposite directions. The rocking member is operable by the interlocking lever, and an actuating member having detecting portions corresponding to and engageable with the pair of arms. The actuating member is operable to actuate the diaphragm-interlocking lever upon detection of the stop-down signal through one of the pair of arms irrespective of whether the actuating member is installed in the normal or the reverse direction with respect to the camera body.

The rocking member may comprise a pair of arms with the member pivoted so that when one arm is depressed by the interlocking lever the other arm is raised. The actuating member is operable by the other of the pair of arms which is raised when the one of the arms is depressed by the interlocking lever.

The invention will become more fully apparent from the following detailed description of an embodiment thereof taken in conjunction with the accompanying drawings.

DESCRIPTION OF THE PREFERRED EMBODIMENTS

Figure 1:
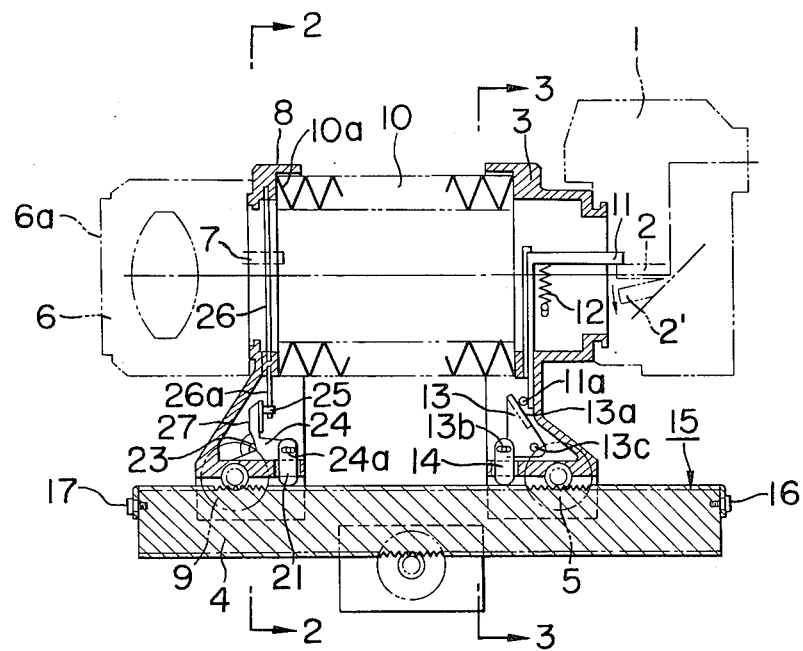
FIG. 1 is a longitudinal cross-section of an embodiment of the present invention.

Referring to FIG. 1, a camera body 1 has an actuating lever 2 movable in the direction of arrow in response to operation of a shutter release button (not shown) provided in the camera body 1 and is mounted on the camera mount 3 of a bellows device. The camera mount is slidable on a rail 4 by rotation of an operating knob 5. A picture-taking lens 6 has a preset aperture and a diaphragm lever 7 for stopping down the aperture to a preset value. The lens is mounted on the lens mount 8 of the bellows device. The lever 7 is downwardly biased by spring means (not shown). The lens mount is slidable on the rail 4 by rotation of an operating knob 9. A bellows 10 is removably provided between the lens mount 8 and the camera mount 3. The camera mount 3, the rail 4, the lens mount 8 and the bellows 10 together constitute a bellows device.

Figure 3:
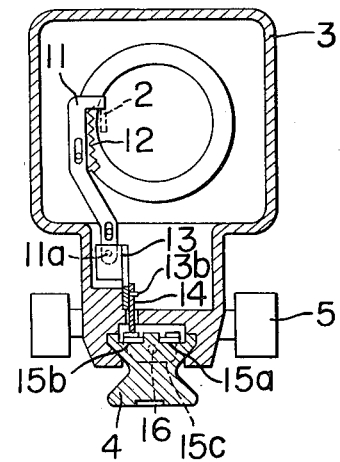
FIG. 3 is a cross-section taken approximately in the plane of line 3—3 of FIG. 1.

The camera mount will now be described with reference to FIGS. 1, 3 and 4. Provided on the camera mount is an interlocking lever 11 vertically movable and downwardly biased by a spring 12 and having one end thereof restrained by the actuating lever 2 of the camera body 1. As the actuating lever 2 is moved downwardly in the direction of arrow (FIG. 4) upon operation of the shutter release button, the interlocking lever 11 is released and is moved downwardly by the spring 12. A pin 11a secured to extend from the other end of the interlocking lever is in engagement with a ramp 13a of a bell crank 13 pivotally mounted on a pivot pin 13c. Downward sliding movement of the interlocking lever 11 causes the bell crank 13 to pivot counter-clockwise about the pin 13c.

Figure 4:
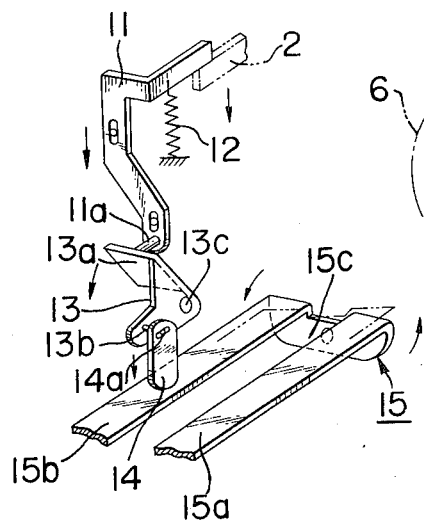
FIG. 4 is a perspective view of the camera mount.

As shown in FIG. 4, a pin 13b secured to extend from the bell crank 13 is received in an elongated horizontally extending slot 14a provided in a member 14 mounted for vertical movement. When the bell crank 13 turns counterclockwise, the member 14 moves down.

A rocking member 15 has a pair of spaced, parallel arms 15a and 15b connected to each other at their ends by end portions 15c. The rocking member which extends along the rail 4 is pivotally supported on the rail 4 by pivot pins 16 and 17 which extend through the opposite end portions 15c and into the underlying rail. The arm 15b is in engagement with the slidable member 14. Thus, in FIG. 4, downward movement of the slidable member 14 resulting from operation of the shutter release button will depress the arm 15b and thereby raise the arm 15a. In other words, the rocking member 15 will pivot counter-clockwise about the pivot pins 16 and 17.

Figure 2:
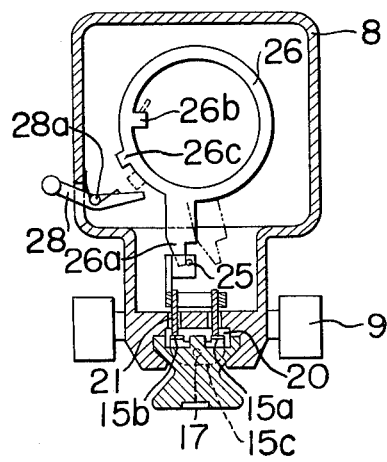
FIG. 2 is a cross-section taken approximately in the plane of line 2—2 of FIG. 1.

The lens mount 8 will now be described with reference to FIGS. 1, 2 and 5. As more particularly shown in FIG. 5, the lens mount is provided with a pair of slidable plates 20, 21 bearing against the pair of arms 15a, 15b, respectively of the rocking member. A lever 22 is secured to one end of a shaft 23 rotatably supported on the lens mount 8. The lever 22 has on the other end thereof a studded pin 22a received in a slot 20a (see FIG. 6) formed in the slidable plate 20. A bell crank 24 is secured to the shaft 23 and has on one end thereof a studded pin 24a received in a slot 21a formed in the slidable plate 21. Thus, upward sliding movement of one of the pair of slidable plates 20, 21 will cause counter-clockwise rotation of the bell crank 24 about the shaft 23.

Figure 5:
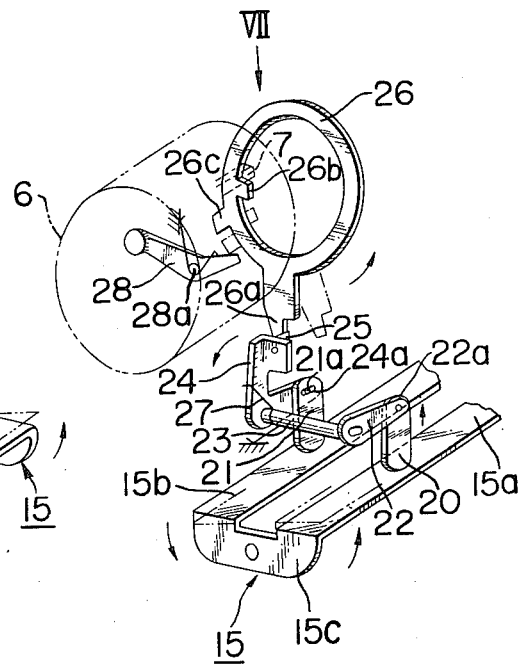
FIG. 5 is a perspective view of the lens mount.
Figure 7:
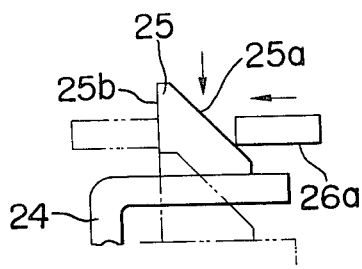
FIG. 7 shows the configuration of a stop member as viewed in the direction of arrow VII in FIG. 5.

In the relationship of the parts as shown in FIG. 5, as the lever 15a is raised by the counter-clockwise rotation of the rocking member 15 resulting from operation of the shutter release button, the slidable plate 20 is also raised to thereby rotate the bell crank 24 counter-clockwise. The bell crank has a stop member 25 secured to one end thereof. As shown in FIG. 7, which illustrates the configuration of the stop member 25 as viewed in the direction of arrow VII in FIG. 5, the stop member 25 has a ramp face 25a and a perpendicular face 25b and restrains an aperture ring 26 by the perpendicular face 25b being engaged with a projection 26a extending from the aperture ring 26 which is biased counter-clockwise by the diaphragm lever 7. Thus, the counter-clockwise rotation of the bell crank 24 resulting from the upward movement of the lever 15a of the rocking member 15 will bring the perpendicular face 25b of the stop member 25 out of engagement with the projection 26a, thereby releasing the aperture ring 26 from its restrained condition. The aperture ring 26 has an internal restraining projection 26b for restraining the diaphragm lever 7 of the picture-taking lens 6. The diaphragm lever is downwardly biased by means (not shown) and therefore may be moved down upon disengagement of the projection 26a resulting from the counter-clockwise rotation of the bell crank 24, to thereby depress the projection 26b and rotate the aperture ring 26. By such downward movement of the diaphragm lever 7, the aperture of the picture-taking lens 6 is stopped down to its preset value.

As described, the diaphragm lever 7 of the picture-taking lens is actuated to stop down the lens aperture upon operation of the shutter release button of the camera body, and through the agency of the interlocking lever 11, the bell crank 13, the slidable member 14, the rocking member 15, the slidable plate 20, the bell crank 24 and the aperture ring 26 are actuated.

After the aperture has been so stopped down, the shutter may be released to effect film exposure. Thereafter, the actuating lever 2 of the camera body may automatically return to its original position 2 from the lowered position 2', and accordingly, the interlocking lever 11 returns to the position shown in FIG. 1.

The bell crank 24 of the lens mount 8 is biased in a clockwise direction by a spring 27 so that the return of the interlocking lever 11 to its original position is followed by the return of the slidable plates 20, 21, the rocking member 15, the slidable member 14 and the bell crank 13 to their respective positions.

Also, the return of the aperture ring 26 and the diaphragm lever 7 of the picture-taking lens to their original positions may be accomplished by the use of a charge lever 28. More specifically, the charge lever 28 is extraneously operated to rotate about the shaft 28a as viewed in FIGS. 2 and 5, whereupon one end of the lever 28 engages the projection 26c of the aperture ring 26 which is then located as indicated by the dotted line showing, thereby rotating the aperture ring 26, and accordingly the diaphragm lever 7, in a clockwise direction.

The described rotational movement causes the projection 26a then located as indicated by solid line to be moved leftwardly as viewed in FIG. 7, and into engagement with the ramp face 25a, thereby depressing the bell crank 24 and the stop member 25 against the force of the spring 27 and thus, riding over the stop member 25 to return to the shown position. As a result, the aperture of the picture-taking lens is opened, and, all the members return to their normal positions.

The attachment of the picture-taking lens 6 to the bellows device in reverse direction will now be described. Referring to FIG. 1, the lens mount 8 is removed from the end 10a of the bellows portion 10, the lens and the lens mount 8 are attached to the rail 4 with their directions reversed, and the end portion 6a of the picture-taking lens 6 is attached to the end 10a of the bellows 10.

Figure 6:
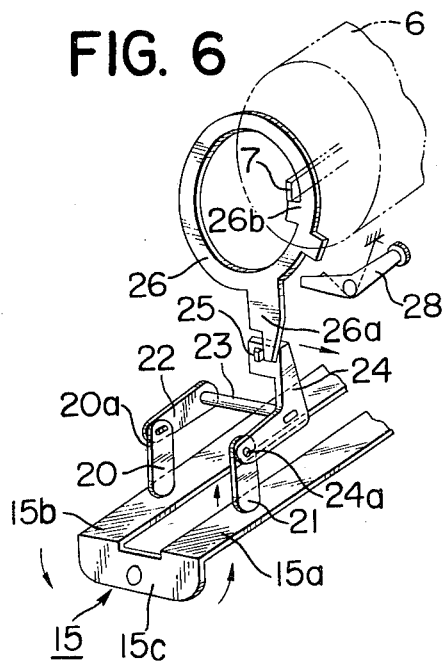
FIG. 6 is a view similar to FIG. 5 except that the picture-taking lens is attached in reverse direction.

The position in which the lens mount 8 has been attached to the rail in reverse direction is shown in FIG. 6. When, in this position, the shutter release button is operated, the rocking member 15 is rotated counter-clockwise in the same manner as already described to raise the arm 15a, and accordingly, the slidable plate 21. Thus, the bell crank 24 is rotated clockwise to disengage the stop member 25 from the projection 26a, and thereby permit movement of the aperture ring 26 and the diaphragm lever 7.

As in the case where the lens has been mounted in normal direction, the preset aperture may be stopped down by operation of the shutter release button in the same manner as previously described though the lens is mounted in reverse directions. The position of the rocking member brought about by its rotation to thereby locate the respective arms 15a, 15b may be detected by the slidable plates 20, 21 and the detection signal provides a signal for automatic stop-down. This ensures automatic stop-down to be achieved irrespective of whether the lens is attached to the bellows device in the normal or the reverse direction.

It is believed that the advantages and improved results furnished by the bellows device of the invention will be apparent from the foregoing detailed description of a preferred embodiment of the invention. Various modifications and changes may be made without departing from the spirit and scope of the invention as sought to be defined in the following claims.

I claim:

1. A bellows device having an automatic diaphragm-interlocking mechanism and comprising a camera mount, a bellows portion, a lens mount and a guide rail, the camera mount being provided with an interlocking lever operatively associated with the shutter mechanism of a camera body so as to be operable in response to a diaphragm blade stop-down signal during shutter release, the lens mount being provided with a diaphragm-interlocking lever operable to actuate a diaphragm lever operatively associated with the aperture mechanism of the lens, the bellows device including:
- a rocking member comprising a pair of arms extending along said guide rail, the arms being moveable in opposite directions, the rocking member being operable by said interlocking lever; and
- an actuating member having detecting portions corresponding to and engageable with said pair of arms, said actuating member being operable to actuate said diaphragm-interlocking lever upon detection of said stop-down signal through one of the arms irrespective of whether the actuating member is installed in the normal or the reverse direction with respect to the camera body.

2. A device as defined in claim 1, wherein the rocking member is mounted to pivot so that when one of the arms is depressed by said interlocking lever the other arm is raised.

3. A device as defined in claim 2, wherein said actuating member is operable by an arm which is raised when the other arm is depressed by said interlocking lever.

* * * * *